US011332152B2

(12) United States Patent
Moshchuk et al.

(10) Patent No.: US 11,332,152 B2
(45) Date of Patent: May 17, 2022

(54) METHOD AND APPARATUS FOR DETERMINING A VELOCITY OF A VEHICLE

(71) Applicant: GM GLOBAL TECHNOLOGY OPERATIONS LLC, Detroit, MI (US)

(72) Inventors: Nikolai K. Moshchuk, Grosse Pointe, MI (US); David Andres Pérez Chaparro, Ferndale, MI (US); Kausalya Singuru, Troy, MI (US); Hualin Tan, Novi, MI (US); James H. Holbrook, Fenton, MI (US); Curtis L. Hay, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 16/886,976

(22) Filed: May 29, 2020

(65) Prior Publication Data
US 2021/0370958 A1    Dec. 2, 2021

(51) Int. Cl.
| | | |
|---|---|---|
| *B60W 40/105* | (2012.01) | |
| *B60W 40/11* | (2012.01) | |
| *B60W 40/112* | (2012.01) | |
| *B60W 30/02* | (2012.01) | |
| *B60W 40/101* | (2012.01) | |
| *B60W 40/13* | (2012.01) | |

(52) U.S. Cl.
CPC .......... *B60W 40/105* (2013.01); *B60W 30/02* (2013.01); *B60W 40/101* (2013.01); *B60W 40/11* (2013.01); *B60W 40/112* (2013.01); *B60W 2040/1323* (2013.01); *B60W 2520/06* (2013.01)

(58) Field of Classification Search
CPC .. B60W 40/105; B60W 30/02; B60W 40/101; B60W 40/11; B60W 40/112; B60W 2040/1323; B60W 2520/06
See application file for complete search history.

(56) References Cited

U.S. PATENT DOCUMENTS

| | | | |
|---|---|---|---|
| 7,908,112 B2 * | 3/2011 | Nardi ...................... | B60T 8/172 702/142 |
| 8,234,090 B2 | 7/2012 | Nardi et al. | |

(Continued)

*Primary Examiner* — Yazan A Soofi
*Assistant Examiner* — Naeem Taslim Alam
(74) *Attorney, Agent, or Firm* — Quinn IP Law

(57) ABSTRACT

A vehicle including a Global Positioning System (GPS) sensor, an Inertial Measurement Unit (IMU), and an Advanced Driver Assistance System (ADAS) is described. Operating the vehicle includes determining, via the GPS sensor, first parameters associated with a velocity, a position, and a course, and determining, via the IMU, second parameters associated with acceleration and angular velocity. Roll and pitch parameters are determined based upon the first and second parameters. A first vehicle velocity vector is determined based upon the roll and pitch parameters, the first parameters, and the second parameters; and a second vehicle velocity vector is determined based upon the roll and pitch parameters, road surface friction coefficient, angular velocity, road wheel angles and the first vehicle velocity vector. A final vehicle velocity vector is determined based upon fusion of the first and second vehicle velocity vectors. The vehicle is controlled based upon the final vehicle velocity vector.

19 Claims, 4 Drawing Sheets

(56) References Cited

U.S. PATENT DOCUMENTS

| | | | | |
|---|---|---|---|---|
| 9,645,250 | B2* | 5/2017 | Zeng | G01S 19/52 |
| 2005/0080542 | A1* | 4/2005 | Lu | B60W 40/064 |
| | | | | 701/91 |
| 2007/0067085 | A1* | 3/2007 | Lu | B60T 8/24 |
| | | | | 340/440 |
| 2010/0131145 | A1 | 5/2010 | Ryu et al. | |
| 2010/0131229 | A1* | 5/2010 | Nardi | B60T 8/172 |
| | | | | 702/142 |
| 2012/0046803 | A1* | 2/2012 | Inou | A61B 5/163 |
| | | | | 701/1 |
| 2015/0057877 | A1* | 2/2015 | Singh | B60C 11/246 |
| | | | | 701/34.4 |
| 2015/0308827 | A1* | 10/2015 | Fujii | G01P 21/00 |
| | | | | 702/151 |
| 2017/0261989 | A1* | 9/2017 | Ishioka | G05D 1/0212 |
| 2017/0350721 | A1* | 12/2017 | Ren | G01C 19/00 |
| 2018/0275654 | A1* | 9/2018 | Merz | G08G 5/045 |
| 2019/0003839 | A1* | 1/2019 | Hu | G06F 16/29 |
| 2019/0009786 | A1* | 1/2019 | Liu | B60K 37/02 |
| 2019/0375394 | A1* | 12/2019 | Maleki | B60W 20/11 |
| 2021/0139028 | A1* | 5/2021 | Zhou | G06N 20/00 |
| 2021/0253101 | A1* | 8/2021 | Nahrwold | B62D 6/007 |

\* cited by examiner

METHOD AND APPARATUS FOR DETERMINING A VELOCITY OF A VEHICLE

INTRODUCTION

Vehicle control systems may benefit from information related to conditions of a travel surface, and may employ such information as an input for controlling one or more systems such as braking, cornering and acceleration.

Present methods for estimating or otherwise determining a travel vector for a vehicle may not provide sufficient accuracy when extended to highly nonlinear vehicle maneuvers such as may occur when a vehicle is operating on a slippery surface and where a travel surface includes significant road bank/grade driving scenarios or highly nonlinear dynamic maneuvers such as may occur in the presence of travel surface conditions that include snow and/or ice, or when the vehicle is travelling uphill or downhill.

Inaccuracies or errors in determining a travel vector for a vehicle may affect performance of driving assistance systems such as an advanced driving assistance system (ADAS) or another autonomous vehicle system.

SUMMARY

A vehicle including a Global Positioning System (GPS) sensor, an Inertial Measurement Unit (IMU), and an Advanced Driver Assistance System (ADAS) is described. A method and associated system for operating the vehicle includes determining, via the GPS sensor, first parameters associated with a velocity, a position, and a course for the vehicle, and determining, via the IMU, second parameters associated with acceleration and angular velocity for the vehicle. Roll and pitch parameters are determined based upon the first and second parameters. A first vehicle velocity vector is determined based upon the roll and pitch parameters, the first parameters, and the second parameters; and a second vehicle velocity vector is determined based upon the second parameters associated with road surface friction coefficient, angular velocity, road wheel angles for the vehicle and the first vehicle velocity vector. A final vehicle velocity vector is determined based upon fusion of the first and second vehicle velocity vectors for the vehicle. Operation of the vehicle is controlled based upon the final vehicle velocity vector.

An aspect of the disclosure includes determining the roll and pitch parameters based upon the synchronized first and second parameters by executing a first state estimator, which may be in the form of a first Extended Kalman filter to determine the roll and pitch parameters based upon the first parameters and the second parameters.

Another aspect of the disclosure includes executing the first Extended Kalman filter to determine the roll and pitch parameters by executing a six degree-of-freedom (6-DOF) Extended Kalman filter to determine the roll and pitch parameters based upon the first parameters and the second parameters.

Another aspect of the disclosure includes determining the first vehicle velocity vector based upon the roll and pitch parameters, the first parameters, and the second parameters by executing a second state estimator, which may be in the form of a second Extended Kalman filter to determine the first vehicle velocity vector based upon the roll and pitch parameters, the first parameters, and the second parameters.

Another aspect of the disclosure includes executing the second Extended Kalman filter to determine the first vehicle velocity vector by executing a three degree-of-freedom (3-DOF) Extended Kalman filter to determine the first vehicle velocity vector based upon the roll and pitch parameters, the first parameters, and the second parameters.

Another aspect of the disclosure includes synchronizing the first and second parameters, and determining the roll and pitch parameters based upon the synchronized first and second parameters.

Another aspect of the disclosure includes compensating the second parameters associated with acceleration and angular velocity of the vehicle and the roll and pitch parameters based upon gravity to determine an acceleration vector, and executing the second Extended Kalman filter to determine the first vehicle velocity vector based upon the acceleration vector and the first parameters.

Another aspect of the disclosure includes determining the second vehicle velocity vector based upon the second parameters associated with road surface friction coefficient, angular velocity, road wheel angle for the vehicle and the first vehicle velocity vector by executing a third state estimator, which may be in the form of a third Extended Kalman filter to determine the first vehicle velocity vector based upon the roll and pitch parameters, road surface friction coefficient, angular velocity, road wheel angles for the vehicle and the first vehicle velocity vector.

Another aspect of the disclosure includes executing the third Extended Kalman filter to determine the second vehicle velocity vector by executing a Bicycle Model Extended Kalman filter to determine the second vehicle velocity vector based upon the roll and pitch parameters, road surface friction coefficient, angular velocity, road wheel angles for the vehicle and the first vehicle velocity vector.

Another aspect of the disclosure includes the vehicle including an Advanced Driver Assistance System (ADAS), wherein controlling operation of the vehicle based upon the final vehicle velocity vector including controlling the ADAS based upon the final vehicle velocity vector.

Another aspect of the disclosure includes an operating system that includes one of a propulsion system, a steering system, or a braking system, wherein controlling operation of the vehicle based upon the final vehicle velocity vector includes controlling, via the ADAS, one of the propulsion system, the steering system, or the braking system based upon the final vehicle velocity vector.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
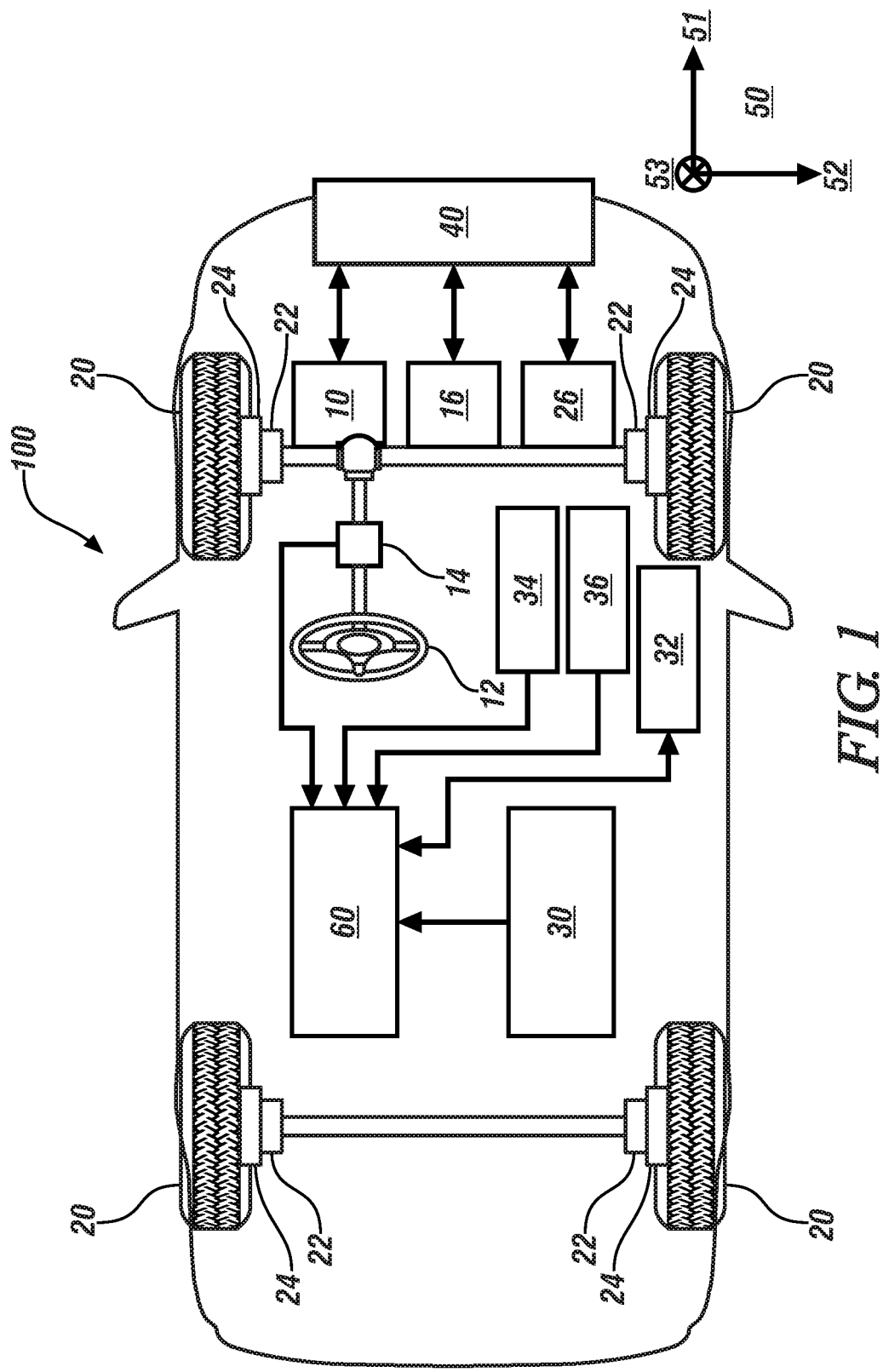
FIG. 1 schematically illustrates a top-view of a vehicle disposed on a travel surface, in accordance with the disclosure.

FIG. 1, consistent with embodiments disclosed herein, schematically illustrates a vehicle 100 that is disposed on a travel surface, wherein the vehicle 100 includes operating systems including, e.g., a propulsion system 10, a steering system 16, and a wheel braking system 26. The steering system 16 includes a steering wheel 12 and a steering actuator 14. The vehicle 100 also includes a plurality of wheels 20, wheel speed sensors 22 and wheel brakes 24, a spatial monitoring system 30, a navigation system 32, and an advanced driver assistance system (ADAS) 40. A top-view of the vehicle 100 is shown. The vehicle 100 and the travel surface define a spatial domain in the form of a three-dimensional coordinate system 50 that includes a longitudinal (X) axis 51, a lateral (Y) axis 52 and a vertical (Z) axis 53. The longitudinal axis 51 is defined by a longitudinal axis of the vehicle 100, the lateral axis 52 is defined by a lateral axis of the vehicle 100, and the vertical axis 53 is defined as being orthogonal to a plane defined by the longitudinal axis 51 and the lateral axis 52. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The navigation system 32 employs information from a Global Positioning System (GPS) sensor 36 and an Inertial Measurement Unit (IMU) 34. In one embodiment, the GPS sensor 36 is configured as a global navigation satellite system (GNSS) sensor. The IMU 34 is an electronic device that employs one or more of a combination of accelerometers, gyroscopes, and magnetometers to measure and report specific force, angular rate, yaw, and orientation of the vehicle 100. The IMU 34 allows a receiver of the GPS sensor 36 to function when signals from the GPS sensor 36 are unavailable, such as when the vehicle 100 is operating in a tunnel, inside a building, or when electronic interference is present. GPS data may be sampled at a rate of 10 Hz. IMU data may be sampled at a rate of 100 Hz.

The ADAS 40 is arranged to provide operator assistance features by controlling one of the operating systems, i.e., one or more of the propulsion system 10, the steering system 16, the wheel braking system 26, in conjunction with or without direct interaction of the vehicle operator. The ADAS 40 includes a controller and one or a plurality of subsystems that provide operator assistance features, including one or more of an adaptive cruise control (ACC) system, a lane-keeping control (LKY) system, a lane change control (LCC) system, an autonomous braking/collision avoidance system, and/or other systems that are configured to command and control autonomous vehicle operation separate from or in conjunction with operator requests. The ADAS 40 may interact with and access information from an on-board map database for route planning and to control operation of the vehicle 100 via the lane-keeping system, the lane-centering system, and/or other systems that are configured to command and control autonomous vehicle operation. Autonomous operating commands may be generated to control the ACC system, the LKY system, the LCC system, the autonomous braking/collision avoidance system, and/or the other systems. Vehicle operation may be in response to operator requests and/or autonomous vehicle requests. Vehicle operation includes acceleration, braking, steering, steady-state running, coasting, and idling. Operator requests can be generated based upon operator inputs to an accelerator pedal, a brake pedal, a steering wheel, a transmission range selector, the ACC system, etc.

The on-board navigation system 32 may include a computer-readable storage device or media (memory) that includes a digitized roadway map and is in communication with the ADAS 40. The concepts described herein may be employed on various systems that may benefit from information determined from an embodiment of the spatial monitoring system 30 in a manner that is described herein.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example, each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
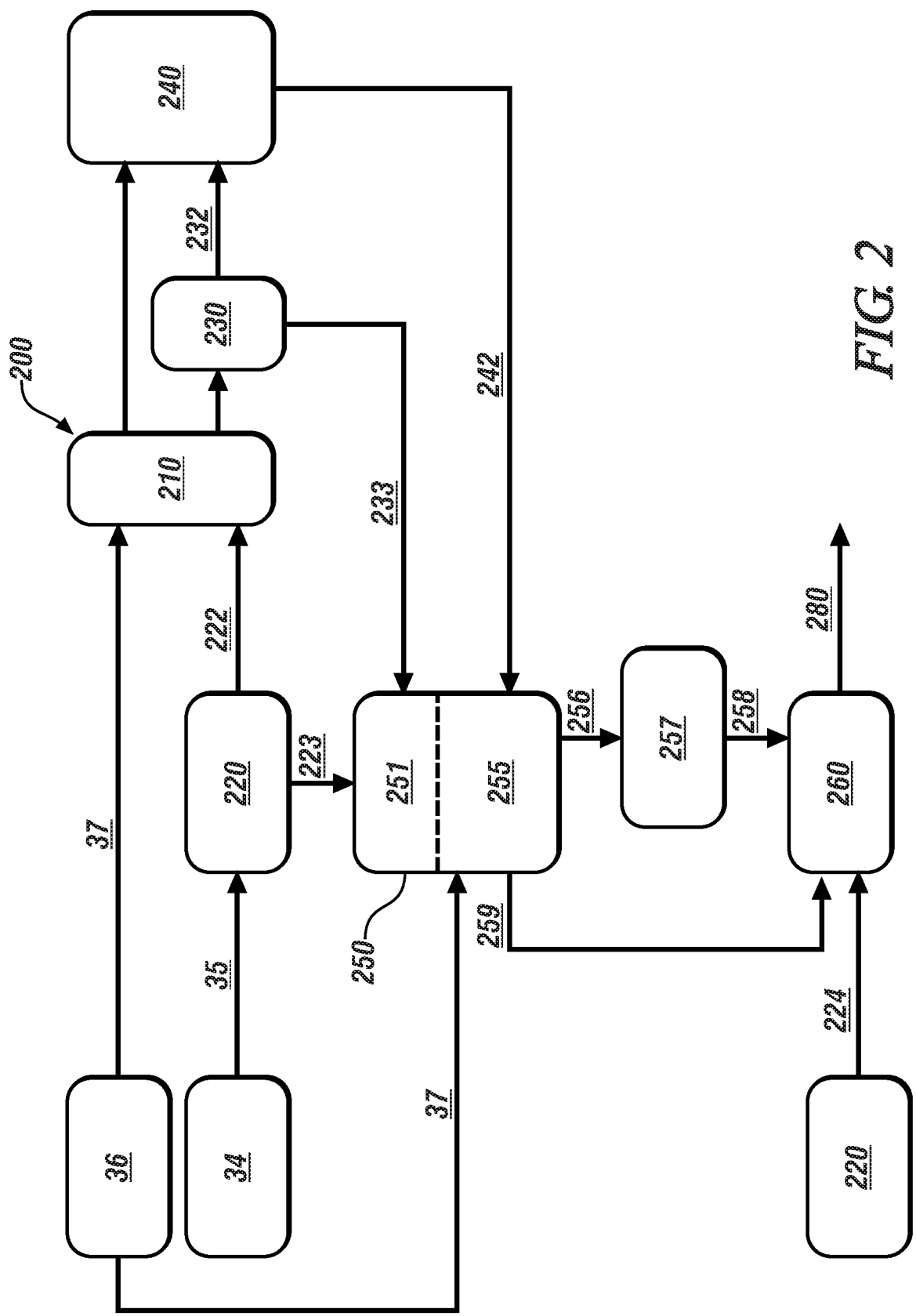
FIG. 2 schematically shows a state flow routine, which provides an analytical process for dynamically determining a final vehicle velocity vector $\hat{V}_x$, $\hat{V}_y$, in accordance with the disclosure.
Figure 3:
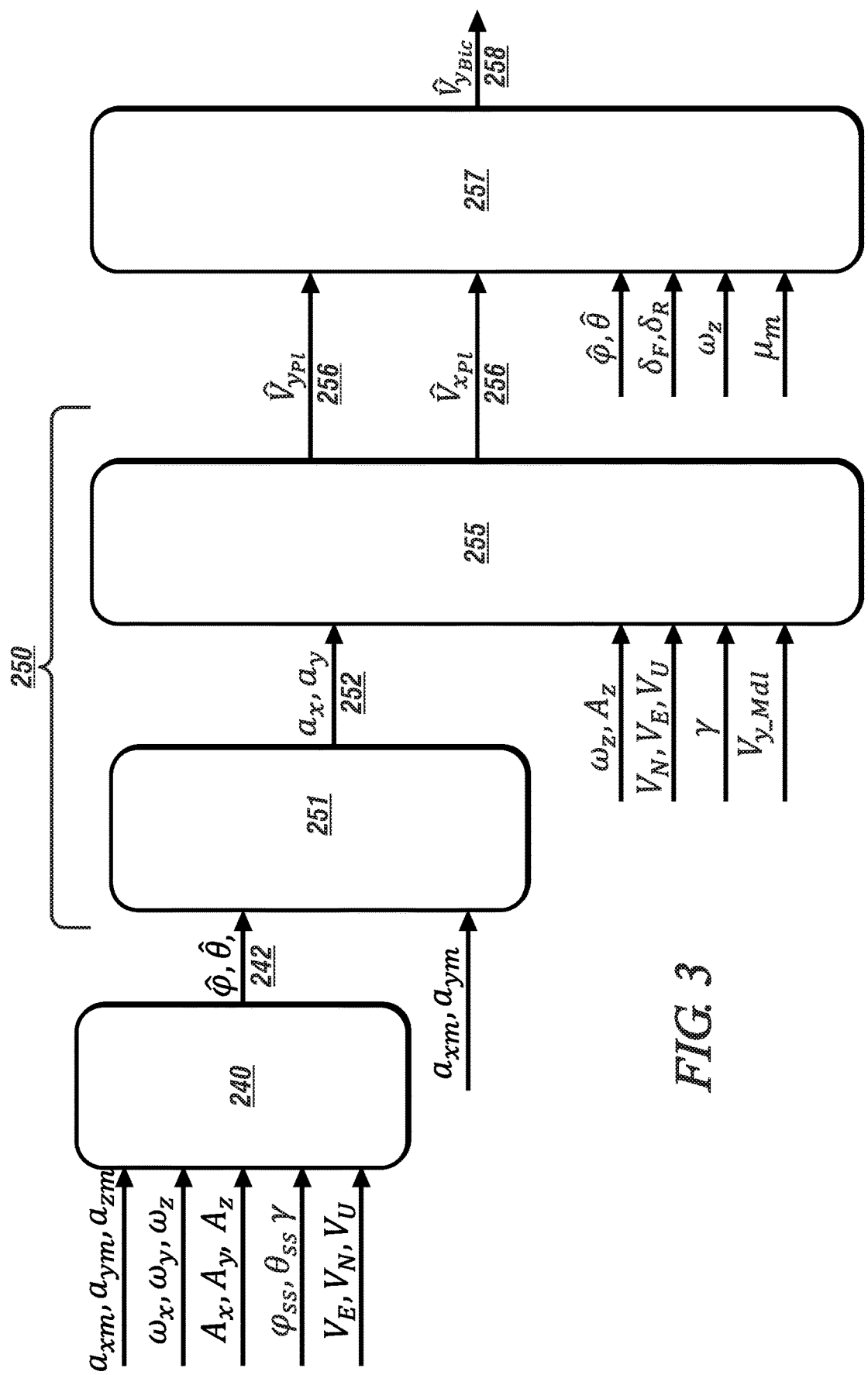
FIG. 3 schematically shows additional details associated with the state flow routine described with reference to FIG. 2, in accordance with the disclosure.

Referring now to FIGS. 2 and 3, a methodology and structure for estimating a vehicle velocity vector and vehicle roll/pitch/yaw angle with respect to a navigational frame East-North-Up (ENU) is described in context of an embodiment of the vehicle 100 of FIG. 1, employing parameters from the GPS sensor 36 and the IMU 34. This GPS-IMU-based approach extends state estimation to highly nonlinear dynamic maneuvers that include, e.g., road surfaces that may include snow, ice, and road conditions that include uphill or downhill maneuvers. Longitudinal, lateral, and vertical vehicle velocities are described with reference to a vehicle reference frame, and vehicle yaw, pitch and roll are described and determined with respect to a navigation frame.

FIGS. 2 and 3 schematically show details related to an embodiment of a state flow routine 200, which may be implemented as software, firmware, programs, instructions, control routines, code, algorithms, and the like in the on-vehicle controllers 60 of the vehicle 100 described with reference to FIG. 1. The state flow routine 200 provides an analytical process for dynamically determining a final vehicle velocity vector $\hat{V}_x$, $\hat{V}_y$ 280 based upon parameters derived from information obtained from the GPS sensor 36 and the IMU 34. The final vehicle velocity vector $\hat{V}_x$, $\hat{V}_y$ 280 may be employed by the ADAS 40 to control operation of the vehicle 100, including controlling one or more of the propulsion system 10, the steering system 16, and the wheel braking system 26. The final vehicle velocity vector $\hat{V}_x$, $\hat{V}_y$ 280 includes, in one embodiment, an estimated longitudinal velocity $\hat{V}_y$ and an estimated lateral velocity $\hat{V}_x$.

The GPS sensor 36 generates a first set of parameters 37 associated with vehicle velocity, geospatial position, and heading. In one embodiment, the first set of parameters 37 are described with reference to an ENU (East-North-Up) reference frame, and a vehicle reference frame wherein the vehicle positive x-axis point toward the front of the vehicle, the vehicle's positive y-axis or pitch axis points to leftward, and the positive z-axis or yaw axis points upward. The first set of parameters 37 includes vehicle velocity parameters including $V_E$, $V_N$, and $V_U$, which relate to velocities in the respective East (E), North (N), and Up (U) axes.

The vehicle velocity parameters including $V_E$, $V_N$, and the yaw rate may be determined from the state vector of the filter in accordance with the following equations $$V_E = V_x \cos \psi - V_y \sin \psi - r(x_A \sin \psi + y_A \cos \psi)$$

$$V_N = V_x \sin \psi + V_y \cos \psi - r(-x_A \cos \psi + y_A \sin \psi) \quad [1]$$

The first set of parameters 37 also includes vehicle position that is defined in terms of latitude, longitude, and altitude. The first set of parameters 37 includes vehicle course angle γ, which refers to the direction of the vehicle 100 velocity vector. The term heading or yaw refers to the direction a vehicle is pointing. The difference between the heading and course angle of a vehicle is referred to as a side slip angle.

The IMU 34 generates a second set of parameters 35, including acceleration in each of the x, y, and z axes ($a_{xm}$, $a_{ym}$, $a_{zm}$) and angular velocity in each of the x, y, and z axes ($\omega_x$, $\omega_y$, $\omega_z$). The angular accelerations ($A_x$, $A_y$, $A_z$) can be obtained by numerical derivation of the angular velocities.

Referring again to FIG. 2, the state flow routine 200 includes a preliminary signal filter block 220, a time-synchronization block 210, an angle update block 230, a first state estimator 240, a second or planar state estimator block 250 including a second state estimator 255, a third or Bicycle Model state estimator 257, and a data fusion block 260. In one embodiment, the first state estimator 240 is arranged as a first Extended Kalman filter, and more specifically a six degree-of-freedom (6-DOF) Extended Kalman filter. In one embodiment, the planar state estimator block 250 includes a gravity compensation block 251 and a second state estimator 255. In one embodiment, the second state estimator 255 may be configured as a three degree-of-freedom (3-DOF) Extended Kalman filter. An extended Kalman filter (EKF) is a nonlinear version of a Kalman filter that linearizes about an estimate of the current mean and covariance. Additional details related to the planar state estimator block 250 are provided with reference to FIG. 3. In one embodiment, the third state estimator 257 is arranged as an Extended Kalman filter, and more specifically a Bicycle Model Extended Kalman filter to estimate the lateral velocity $\hat{V}_{yBic}$ 258. The first, second and third state estimators 240, 250, 257 include analytical processes that provide estimates of unknown variables based upon parametric measurements that are observed over time, including wherein there are one or more relationships between the parametric measurements.

Referring again to FIG. 2, the second set of parameters 35 are subjected to the preliminary signal filter block 220, which pre-processes the raw sensor data from the IMU 34, in the form of raw linear accelerations and angular accelerations. The preliminary signal filter block 220 checks signal validity, selects the valid signals from redundant sensors, and executes low pass filtering and bias removal to generate unbiased, filtered values for linear accelerations and angular accelerations 222. The preliminary signal filter block 220 also generates filtered values for $a_{xm}$, $a_{ym}$, $\omega_z$ 223.

The unbiased, filtered linear accelerations and angular accelerations 222 and the first set of parameters 37 including the vehicle velocity parameters, the vehicle position data, and the vehicle course angle γ are subjected to the time-synchronization block 210 to time synchronize the first and second sets of parameters 37, 35. Data is synchronized based upon availability of information to the GPS sensor 36, employing a global time clock. Data synchronization occurs at 100 Hz in one embodiment.

The vehicle course angle γ, steady-state pitch θ$_{ss}$, and steady-state roll φ$_{ss}$ 222 that are determined based upon the second set of parameters 35 and their validity as proxies of the yaw, pitch and roll angles is analyzed via the angle update block 230 to determine vehicle parameters 232. This operation is described with reference to FIG. 3.

The angle update block 230 evaluates each of the vehicle course angle γ, pitch θ, and roll φ 222 to determine whether they can be used as measurements for the yaw, pitch and roll angles.

The vehicle course angle γ determined from the GPS sensor 36, and steady-state pitch angle θ$_{ss}$ and steady state roll angle φ$_{ss}$ are employed as additional measurements. The steady-state pitch angle θ$_{ss}$ is expressed in terms of measured longitudinal acceleration and derivative of the longitudinal speed. The steady-state roll angle φ$_{ss}$ is expressed in terms of the lateral acceleration, yaw rate and longitudinal speed. Course angle is the angle between vehicle velocity and direction to North. When yaw update criteria are met, the yaw measurement is available. When pitch update criteria are met, the pitch measurement is available. When roll update criteria are met, the roll measurement is available. The yaw update criteria require essentially straight driving, i.e., there is no side-slip. The roll update criteria require essentially steady-state motion around the roll axis. The pitch update criteria require essentially steady-state motion around the pitch axis. Therefore, the quantity of available measurements may be regularly changing, depending on when GPS updates and/or steady-state angle updates are received.

The criteria for updating the yaw angle include as follows:

if $|\omega_z| \leq \omega_{z\_Thrs1}$ and $|A_z| \leq A_{z\_Thrs1}$ for a time interval of at least $t_{Thrs1}$ then use γ as the measurement for ψ, such as when the yaw rate is small.

The criteria for updating the pitch angle include as follows:

if $|\omega_y| \leq \omega_{y\_Thrs}$, $|A_y| \leq A_{y\_Thrs}$, $|\omega_z| \leq \omega_{z\_Thrs2}$ and $|A_z| \leq A_{z\_Thrs2}$ for a time interval of at least $t_{Thrs2}$ then use θ$_{ss}$ as measurement for θ.

The criteria for updating the roll angle include as follows:

if $|\omega_z| \leq \omega_{z\_Thrs3}$, $|A_z| \leq A_{z\_Thrs3}$, $|\omega_x| \leq \omega_{x\_Thrs}$ and $|A_x| \leq A_{x\_Thrs}$ for a time interval of at least $t_{Thrs3}$ then use φ$_{ss}$ as measurement for φ, respectively.

This operation prevents accumulation of error in the Extended Kalman filter.

Figure 4:
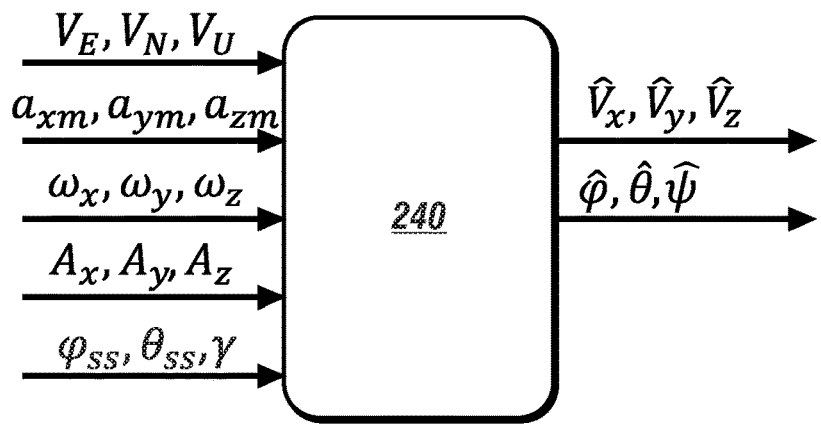
FIG. 4 schematically illustrates inputs and outputs associated with execution of a first state estimator, in accordance with the disclosure.

FIG. 4 illustrates the inputs and outputs associated with execution of the first state estimator 240. Inputs include the first set of parameters 37, including $V_E$, $V_N$, $V_U$, angular accelerations $A_x$, $A_y$, $A_z$, and course or Yaw γ. Inputs also include the second set of parameters 35, including acceleration $a_{xm}$, $a_{ym}$, $a_{zm}$, and angular velocities $\omega_x$, $\omega_y$, $\omega_z$. The inputs may also include vehicle course angle γ, steady-state pitch θ$_{ss}$, and steady state roll φ$_{ss}$ 232 that are output from the angle update block 230 when such information is valid. As described herein, the complete set of outputs from the first state estimator 240 includes estimates of $\hat{V}_x$, $\hat{V}_y$, $\hat{V}_z$, and estimates of $\hat{\varphi}$, $\hat{\theta}$, $\hat{\psi}$, which are employed in the planar state estimator block 250.

Figure 5:
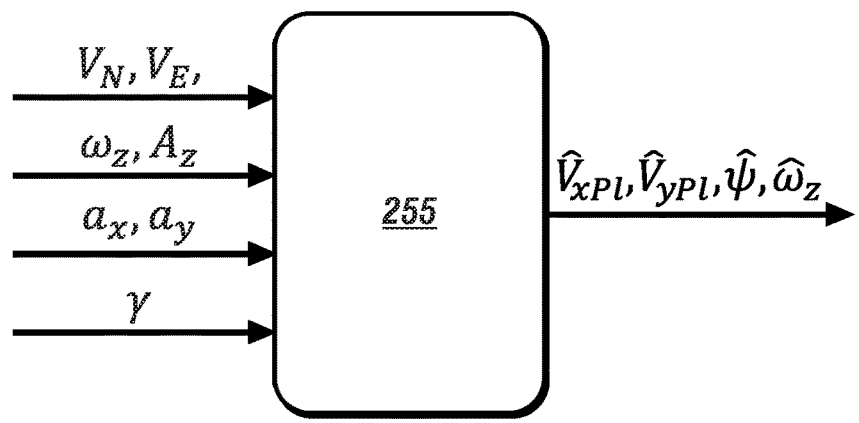
FIG. 5 schematically illustrates inputs and outputs associated with execution of a second state estimator, in accordance with the disclosure.

FIG. 5 illustrates inputs and outputs associated with the second state estimator 255. The inputs include some of the first set of parameters 37, including $V_E$, $V_N$ and some of the second set of parameters 35 including $\omega_z$ and vehicle course angle γ when such information is valid. Inputs also include $a_x$, $a_y$, which are gravity-free since the acceleration components $a_{xm}$, $a_{ym}$ have been removed. The outputs from the second state estimator 255 include the first vehicle velocity vector 256, including $\hat{V}_x$, $\hat{V}_y$, $\hat{\psi}$, $\hat{\omega}_z$.

The synchronized first set of parameters 37 from the GPS sensor 36 that are associated with vehicle velocity, position, and heading, and the second set of parameters 35 from the IMU 34 that are associated with linear accelerations and angular accelerations 222 and yielding the vehicle course angle γ, steady state pitch θ$_{ss}$, and steady state roll φ$_{ss}$ 232 and are provided as input to the first state estimator 240.

The first state estimator 240 includes the following relationships.

The kinematics of spatial motion can be expressed as follows:

$$\dot{V}_x = a_{xm} + g \sin\theta - \omega_y V_z + \omega_z V_y$$

$$\dot{V}_y = a_{ym} - g \cos\theta \sin\varphi + \omega_x V_z - \omega_z V_x$$

$$\dot{V}_z = a_{zm} - g \cos\theta \cos\varphi - \omega_x V_y + \omega_y V_x$$

$$\dot{\psi} = (\omega_y \sin\varphi + \omega_z \cos\varphi)/\cos\theta$$

$$\dot{\theta} = \omega_y \cos\varphi - \omega_z \sin\varphi$$

$$\dot{\varphi} = \omega_x + (\omega_y \sin\varphi + \omega_z \cos\varphi)\sin\theta/\cos\theta \qquad [2]$$

The measurements may be expressed as follows:

$$\begin{pmatrix} V_E \\ V_N \\ V_U \end{pmatrix} = R(\psi, \theta, \varphi) \begin{pmatrix} V_x \\ V_y \\ V_z \end{pmatrix} + \begin{pmatrix} 0 & -\omega_Z & \omega_Y \\ \omega_Z & 0 & -\omega_X \\ -\omega_Y & \omega_X & 0 \end{pmatrix} R(\psi, \theta, \varphi) \begin{pmatrix} x_A \\ y_A \\ z_A \end{pmatrix} \qquad [3]$$

$$\psi = \gamma$$

$$\theta = \theta_{ss}$$

$$\varphi = \varphi_{ss}$$

wherein $R(\psi, \theta, \varphi)$ is a transform matrix from the vehicle reference frame, to the ground (ENU) reference frame; and wherein vector ($x_A$, $y_A$, $z_A$) represents the location of the GPS antenna relative to the CG in the vehicle reference frame.

The state variables include as follows:

$$x = [V_x, V_y, V_z, \psi, \theta, \varphi]'$$

The control variables, in the form of linear and angular accelerations, includes the second set of parameters 35, and are expressed as follows:

$$u = [a_{xm}, a_{ym}, a_{zm}, \omega_x, \omega_y, \omega_z]'$$

The measurements include the first set of parameters 37, and may be expressed as follows:

$$z = [V_E, V_N, V_U]' \text{ or}$$

$$z[V_E, V_N, V_U, \gamma, \theta_{ss}, \varphi_{ss}]'$$

The, steady state pitch θ$_{ss}$, and steady state roll φ$_{ss}$ may be expressed as follows:

$$\theta_{ss} = \sin^{-1}\left(\frac{\dot{V}_x - a_{xm}}{g}\right), \quad \varphi_{ss} = \sin^{-1}\left(\frac{a_{ym} - w_z V_x}{g}\right) \qquad [4]$$

The state space representation used by the first state estimator 240 is as follows:

$$\dot{x} = f(x, u) + w$$

$$z = h(x, u) + v$$

wherein:

w represents process noise, and v represents observation noise.

The first state estimator 240 recursively executes by employing a series of the measurements, i.e., the first set of parameters 37, expressed as $z=[V_E, V_N, V_U, \gamma, \theta_{ss}, \varphi_{ss}]'$ which are observed over time to produce estimates of variables in the form of the estimated vehicle roll and pitch $\hat{\varphi}, \hat{\theta}$ 242 by estimating a joint probability distribution over the variables for each timeframe.

As shown with reference to FIG. 3, the planar state estimator block 250 includes the gravity compensation block 251, and the second state estimator 255 may be configured as a three degree-of-freedom (3-DOF) Extended Kalman filter, and includes the following relationships.

The kinematics of planar motion may be expressed as follows:

$$\dot{V}_x = a_x + rV_y$$

$$\dot{V}_y = a_y - rV_x$$

$$\dot{\psi} = r$$

$$\dot{r} = A_\psi \quad [5]$$

wherein:

$\dot{V}_x$ represents a time-rate change in velocity in the X dimension;

$\dot{V}_y$ represents a time-rate change in velocity in the Y dimension;

$\dot{\psi}$ represents a time-rate change in vehicle heading; and $\dot{r}$ represents the angular acceleration around the yaw axis.

The measurements may be expressed as follows:

$$V_E = V_x \cos\psi - V_y \sin\psi - r(x_A \sin\psi + y_A \cos\psi)$$

$$V_N = V_x \sin\psi + V_y \cos\psi - r(-x_A \cos\psi + y_A \sin\psi)$$

$$r = \omega_z$$

$$\psi = \gamma \quad [6]$$

The state variables include as follows:

$$x = [V_x, V_y, \psi, r]'$$

Control variables (linear and angular accelerations):

$$u = [a_{xm}, a_{ym}, A_\psi]'$$

The gravity compensation block 251 compensates for the effect of gravity in accordance with the following relationships:

$$a_x = a_{xm} + g \sin\theta$$

$$a_y = a_{ym} - g \cos\theta \sin\varphi$$

The state space representation used by the second state estimator 255 is as follows:

$$\dot{x} = f(x, u) + w$$

$$z = h(x) + v \quad [6]$$

wherein:

w represents process noise, and v represents observation noise.

The gravity compensation block 251 determines an acceleration vector $(a_x, a_y)$ 252, which is input to the second state estimator 255, from which the first vehicle velocity vector $(\hat{V}_{xPl}, \hat{V}_{yPl})$ 256 is determined.

The second state estimator 255 recursively executes by employing a series of the measurements, i.e., the first set of parameters 37, including $V_E, V_N$; the vehicle course angle $\gamma$ 233; the filtered values for $a_{xm}, a_{ym}, \omega_z$ 223; and the estimated vehicle roll and pitch $\hat{\varphi}, \hat{\theta}$ 242. The measurements are expressed as $z=[V_E, V_N, V_U, \gamma, \theta_{ss}, \varphi_{ss}]'$, which are observed over time to produce estimates of variables in the form of the first vehicle velocity vector 256 by estimating a joint probability distribution over the variables for each timeframe. The longitudinal velocity $\hat{V}_{xPl}$ 259 of the first vehicle velocity vector 256 is input directly to the data fusion block 260. The first vehicle velocity vector $(\hat{V}_{xPl}, \hat{V}_{yPl})$ 256 is also input to the third state estimator 257.

The third state estimator 257 includes the following relationships.

The Bicycle Model with nonlinear tire force relations can be expressed as follows:

$$M\dot{V}_y = -MrV_x + F_{yF}(\alpha_F)\cos(\delta_F) + F_{yR}(\alpha_R) - Mg\cos(\theta)\sin(\varphi)$$

$$I_z\dot{r} = aF_{yF}(\alpha_F) - bF_{yR}(\alpha_R)$$

$$\dot{\mu} = 0 \quad [7]$$

wherein:

M represents the mass of the vehicle;

$\mu$ represents the road surface friction coefficient;

$F_{yF}$ represents the lateral force at the front tires and is given by $$F_{yF} = c_F \mu \tanh\left(\frac{d_F}{\mu}\alpha_F\right);$$

$F_{yR}$ represents the lateral force at the rear tires and is given by $$F_{yR} = c_R \mu \tanh\left(\frac{d_R}{\mu}\alpha_R\right);$$

$\alpha_F$ represents the slip angle at the front tires and is given by $$\alpha_F = \delta_F - \tan^{-1}\left(\frac{V_y + ar}{V_x}\right);$$

$\alpha_R$ represents the slip angle at the rear tires and is given by $$\alpha_R = \delta_R - \tan^{-1}\left(\frac{V_y - br}{V_x}\right).$$

The measurements may be expressed as follows:

$$V_y = V_{yPl}$$

$$r = \omega_z$$

$$\mu = \mu_m$$

wherein $\mu_m$ represents an estimate or measurement of road surface friction coefficient.

The state variables include as follows:

$$x = [V_y, r, \mu]'$$

The control variables include as follows:

$$u=[\delta_F, \delta_R]'$$

wherein:

$\delta_F$ and $\delta_R$ represent the front and rear road wheel angles.

The state space representation used by the third state estimator 257 is as follows:

$$\dot{x} = f(x,u) + w$$

$$z = h(x) + v$$

Figure 6:
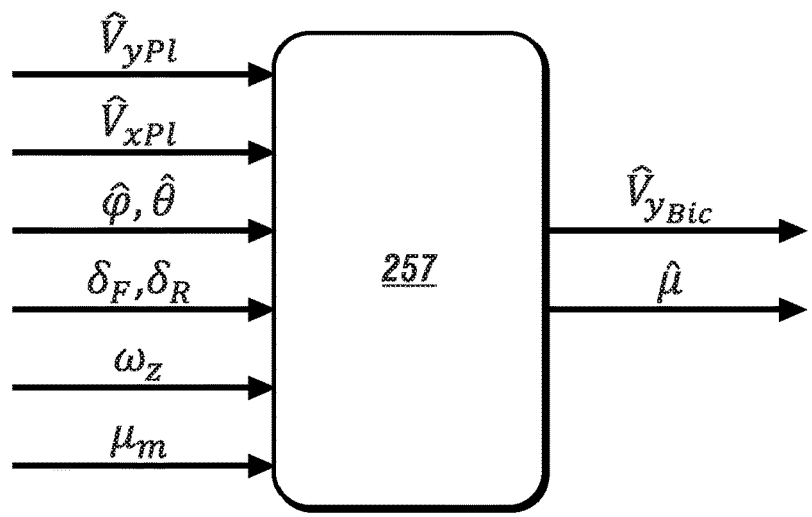
FIG. 6 schematically illustrates inputs and outputs associated with execution of a third state estimator, in accordance with the disclosure.

The third state estimator 257 recursively executes by employing a series of the measurements, i.e., roll and pitch parameters, road surface friction coefficient, angular velocity, road wheel angles for the vehicle 100 and the first vehicle velocity vector. These measurements are observed over time to produce estimates of variables in the form of the second vehicle velocity vector 224 by estimating a joint probability distribution over the variables for each timeframe. FIG. 6 schematically illustrates inputs and outputs associated with execution of the third state estimator 257 to estimate the GPS/IMU/Bicycle Model-based lateral velocity $\hat{V}_{yBic}$ 258 based upon the first vehicle velocity vector ($\hat{V}_{xPl}$, $\hat{V}_{yPl}$) 256.

The state flow routine 200 ensures accurate estimation of the vehicle velocity, in the form of the final vehicle velocity vector $\hat{V}_x$, $\hat{V}_y$ 280 based on kinematics of vehicle motion using a vehicle/tire model. The angle update logic allows for exploiting steady state angles. It also enables fusion of existing approaches to the current based on GPS availability, improving robustness.

The GPS course angle and steady-state pitch and roll angles are employed as additional measurements. Steady-state pitch angle is expressed in terms of measured longitudinal acceleration and derivative of the longitudinal speed. Steady-state roll angle is expressed in terms of the lateral acceleration, yaw rate and longitudinal speed. Course angle is the angle between vehicle velocity and direction to East.

When yaw update criteria are met, the yaw measurement is available. When pitch update criteria are met, the pitch measurement is available. When roll update criteria is met, the roll measurement is available. Yaw update criteria means almost straight driving, i.e., no side-slip. Roll update criteria means almost steady-state motion around the roll axis. Pitch update criteria means almost steady-state motion around the pitch axis. Therefore, the quantity of available measurements may change dynamically, depending on whether there is a GPS update and/or steady-state angle updates. The first state estimator 240, including, e.g., the 6-DOF Extended Kalman filter operates at 10 ms repetition rate. States of accelerations $a_{xm}$, $a_{ym}$, $a_{zm}$ and angular velocities $\omega_x$, $\omega_y$, $\omega_z$ are updated every 10 ms. GPS velocities $V_E$, $V_N$, $V_U$ are updated every 100 ms. Steady-state angle updates are received whenever corresponding criteria are met. Therefore, there may be multiple subcases, wherein each subcase corresponds to a particular measurement set available. And Jacobian of measurement equations also corresponds to a particular case or measurement set.

When implemented on an embodiment of the vehicle 100 having ADAS 40, the state flow routine 200 provides an analytical process for dynamically determining a final vehicle velocity vector $\hat{V}_x$, $\hat{V}_y$ 280 based upon parameters from the GPS sensor 36 and the IMU 34. This includes determining, via the GPS sensor 36, the first set of parameters 37 that are associated with a velocity, a position, and a course for the vehicle 100. This also includes determining, via the IMU 34, the second parameters 35 that are associated with acceleration and angular velocity for the vehicle 100. This also includes determining the roll and pitch parameters 232 based upon the first and second sets of parameters 37, 35, as described with reference to the angle update block 230 of FIG. 2. This also includes determining the first vehicle velocity vector 256 based upon the roll and pitch parameters 232, the first set of parameters 37 and the second set of parameters 35, as described with reference to the first state estimator 240 and the planar state estimator block 250 of FIGS. 2 and 3. This also includes determining the second vehicle velocity vector 224 based upon the roll and pitch parameters, road surface friction coefficient, angular velocity, road wheel angles for the vehicle and the first vehicle velocity vector, as described with reference to the first state estimator 240, the planar state estimator block 250 and the Bicycle Model state estimator block of FIGS. 2 and 6. This also includes determining the second velocity vector ($\hat{V}_x$, $\hat{V}_y$) 224 based upon the second parameters associated with acceleration and angular velocity for the vehicle, which may be determined as described with reference to the preliminary signal filter block 220 of FIG. 2. This also includes determining the final vehicle velocity vector 280 based upon fusion of the first and second vehicle velocity vectors for the vehicle, which may be determined as described with reference to the data fusion block 260 of FIG. 2. Operation of the vehicle 100 may be autonomously controlled based upon the final vehicle velocity vector 280, which may include controlling one or more of steering, braking, and acceleration of the vehicle 100.

The block diagrams in the flow diagrams illustrate the architecture, functionality, and operation of possible implementations of systems, methods, and computer program products according to various embodiments of the present disclosure. In this regard, each block in the block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for operating a vehicle, the method comprising:
   determining, via a Global Positioning System (GPS) sensor, first parameters associated with a velocity, a position, and a course for the vehicle;

determining, via an Inertial Measurement Unit (IMU), second parameters associated with an acceleration and an angular velocity for the vehicle;

determining a road surface friction coefficient and road wheel angles for the vehicle;

determining roll and pitch parameters based upon the first and second parameters;

determining a first vehicle velocity vector based upon the roll and pitch parameters, the first parameters, and the second parameters;

determining a second vehicle velocity vector based upon the second parameters associated with the acceleration and the angular velocity for the vehicle, and the road surface friction coefficient and the road wheel angles for the vehicle;

executing a data fusion of the first and second vehicle velocity vectors for the vehicle;

determining a final vehicle velocity vector based upon the data fusion of the first and second vehicle velocity vectors for the vehicle; and controlling an operating system of the vehicle based upon the final vehicle velocity vector, wherein the operating system of the vehicle comprises one of a propulsion system, a steering system, or a braking system; and wherein controlling the operating system of the vehicle comprises controlling one of the propulsion system, the steering system, or the braking system based upon the final vehicle velocity vector.

2. The method of claim 1, wherein determining the roll and pitch parameters based upon the first and second parameters comprises executing a first Extended Kalman filter to determine the roll and pitch parameters based upon the first parameters and the second parameters.

3. The method of claim 2, wherein executing the first Extended Kalman filter to determine the roll and pitch parameters comprises executing a six degree-of-freedom (6-DOF) Extended Kalman filter to determine the roll and pitch parameters based upon the first parameters and the second parameters.

4. The method of claim 1, wherein determining the first vehicle velocity vector based upon the roll and pitch parameters, the first parameters, and the second parameters comprises executing a second Extended Kalman filter to determine the first vehicle velocity vector based upon the roll and pitch parameters, the first parameters, and the second parameters.

5. The method of claim 4, wherein executing the second Extended Kalman filter to determine the first vehicle velocity vector comprises executing a three degree-of-freedom (3-DOF) Extended Kalman filter to determine the first vehicle velocity vector based upon the roll and pitch parameters, the first parameters, and the second parameters.

6. The method of claim 1, wherein determining second vehicle velocity vector based upon the roll and pitch parameters, the road surface friction coefficient, the angular velocity, the road wheel angles for the vehicle and the first vehicle velocity vector comprises executing a third Extended Kalman filter to determine the second vehicle velocity vector based upon the roll and pitch parameters, the road surface friction coefficient, the angular velocity, the road wheel angles for the vehicle, and the first vehicle velocity vector.

7. The method of claim 6, wherein executing the third Extended Kalman filter to determine second vehicle velocity vector comprises executing a Bicycle Model Extended Kalman filter to determine the second vehicle velocity vector based upon the roll and pitch parameters, the road surface friction coefficient, the angular velocity, the road wheel angles for the vehicle, and the first vehicle velocity vector.

8. The method of claim 1, further comprising:
synchronizing the first and second parameters; and
determining the roll and pitch parameters based upon the synchronized first and second parameters.

9. The method of claim 1, further comprising:
compensating the second parameters associated with acceleration and angular velocity of the vehicle and the roll and pitch parameters based upon gravity to determine an acceleration vector;
executing a second Extended Kalman filter to determine the first vehicle velocity vector based upon the acceleration vector and the first parameters.

10. The method of claim 1, wherein determining the second vehicle velocity vector based upon the second parameters associated with acceleration, angular velocity and road wheel angle comprises determining longitudinal and lateral velocity estimates based upon inputs from the IMU.

11. The method of claim 1, wherein the vehicle includes an Advanced Driver Assistance System (ADAS), and wherein controlling the operating system of the vehicle based upon the final vehicle velocity vector comprises controlling, via the ADAS, the operating system of the vehicle based upon the final vehicle velocity vector.

12. A method for operating a vehicle, the method comprising:
determining, via a Global Positioning System (GPS) sensor, first parameters associated with a velocity, a position, and a course for the vehicle;
determining, via an Inertial Measurement Unit (IMU), second parameters associated with an acceleration and an angular velocity for the vehicle;
determining a road surface friction coefficient and road wheel angles for the vehicle;
determining roll and pitch parameters based upon the first and second parameters;
determining a first vehicle velocity vector based upon the roll and pitch parameters, the first parameters, and the second parameters;
determining a second vehicle velocity vector based upon the roll and pitch parameters, the road surface friction coefficient, the angular velocity, the road wheel angles for the vehicle and the first vehicle velocity vector;
executing a data fusion of the first and second vehicle velocity vectors for the vehicle;
determining a final vehicle velocity vector based upon the data fusion of the first and second vehicle velocity vectors for the vehicle; and
controlling an operating system of the vehicle based upon the final vehicle velocity vector, wherein the operating system of the vehicle comprises one of a propulsion system, a steering system, or a braking system; and
wherein controlling the operating system of the vehicle comprises controlling one of the propulsion system, the steering system, or the braking system based upon the final vehicle velocity vector.

13. The method of claim 12, wherein determining the roll and pitch parameters based upon the first and second parameters comprises executing a first state estimator to determine the roll and pitch parameters based upon the first parameters and the second parameters.

14. The method of claim 13, wherein executing the first state estimator to determine the roll and pitch parameters comprises executing a six degree-of-freedom (6-DOF) state estimator to determine the roll and pitch parameters based upon the first parameters and the second parameters.

15. The method of claim 12, wherein determining the first vehicle velocity vector based upon the roll and pitch parameters, the first parameters, and the second parameters comprises executing a second state estimator to determine the first vehicle velocity vector based upon the roll and pitch parameters, the first parameters, and the second parameters.

16. The method of claim 15, wherein executing the second state estimator to determine the first vehicle velocity vector comprises executing a three degree-of-freedom (3-DOF) state estimator to determine the first vehicle velocity vector based upon the roll and pitch parameters, the first parameters, and the second parameters.

17. The method of claim 12, wherein determining the second vehicle velocity vector based upon the roll and pitch parameters, road surface friction coefficient, angular velocity, road wheel angles for the vehicle and the first vehicle velocity vector comprises executing a third state estimator to determine the second vehicle velocity vector based upon the roll and pitch parameters, road surface friction coefficient, angular velocity, road wheel angles for the vehicle and the first vehicle velocity vector.

18. The method of claim 17, wherein executing the third state estimator to determine the second vehicle velocity vector comprises executing a Bicycle Model state estimator to determine the second vehicle velocity vector based upon the roll and pitch parameters, road surface friction coefficient, angular velocity, road wheel angles for the vehicle and the first vehicle velocity vector.

19. A vehicle, comprising:
an Advanced Driver Assistance System (ADAS), a Global Positioning System (GPS) sensor, an Inertial Measurement Unit (IMU), an operating system, and a controller;
wherein the ADAS is operatively connected to the operating system;
wherein the controller is in communication with the ADAS, the GPS sensor, and the IMU;
wherein the controller includes an instruction set, the instruction set being executable to:
determine, via the GPS sensor, first parameters associated with a velocity, a position, and a course for the vehicle;
determine, via the IMU, second parameters associated with acceleration and angular velocity for the vehicle;
determine roll and pitch parameters based upon the first and second parameters;
determine a first vehicle velocity vector based upon the roll and pitch parameters, the first parameters, and the second parameters;
determine a second vehicle velocity vector based upon the roll and pitch parameters, a road surface friction coefficient, the angular velocity, road wheel angles for the vehicle and the first vehicle velocity vector;
execute a data fusion of the first and second vehicle velocity vectors for the vehicle;
determine a final vehicle velocity vector based upon the data fusion of the first and second vehicle velocity vectors for the vehicle; and
control, via the ADAS, the operating system based upon the final vehicle velocity vector, wherein the operating system comprises one of a propulsion system, a steering system, or a braking system; and
wherein the instruction set being executable to control, via the ADAS, the operating system based upon the final vehicle velocity vector comprises the instruction set being executable to control, via the ADAS, one of the propulsion system, the steering system, or the braking system.

* * * * *